Jan. 2, 1962   G. T. SENSENEY ETAL   3,015,792
POTENTIOMETER WIPER RECIPROCATING MECHANISM
Filed May 4, 1960
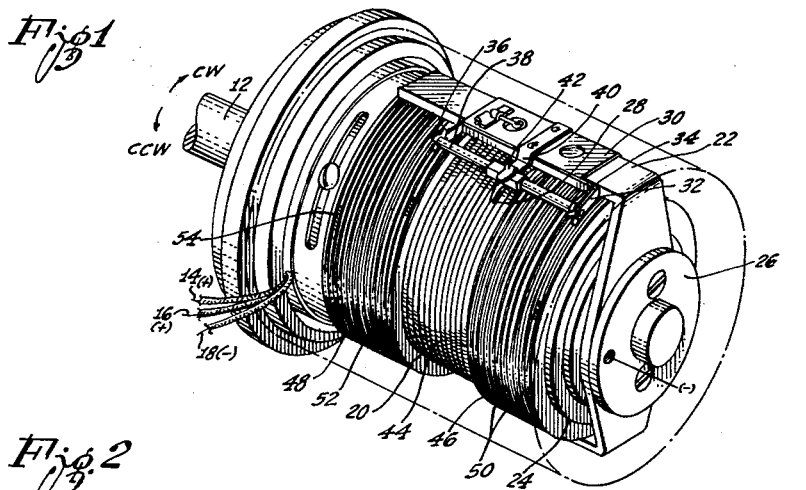
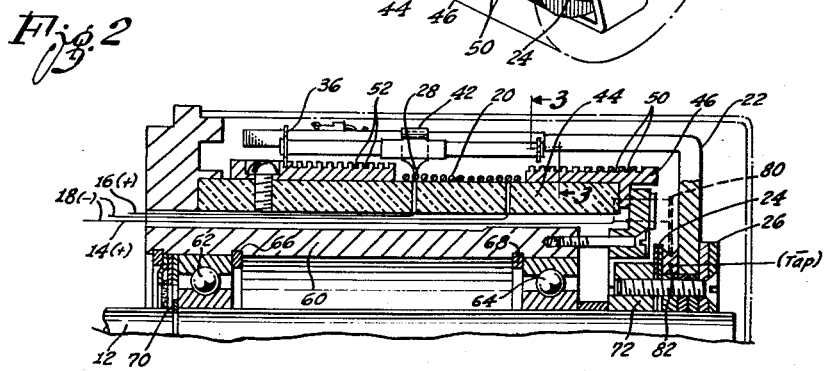
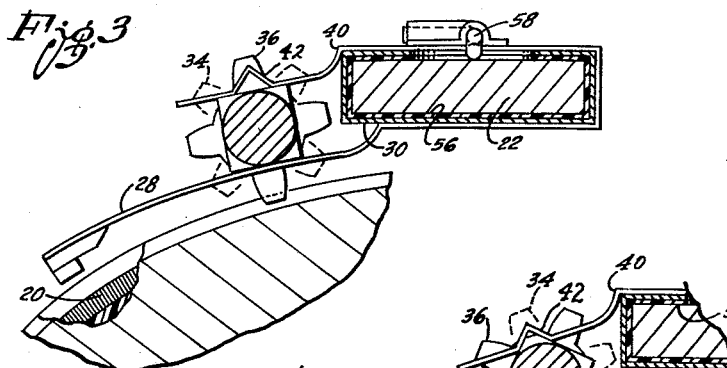
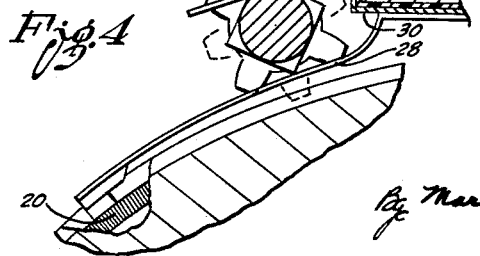
INVENTORS:
George T. Senseney
Dale L. Hardy
By Marvin H. Kleinberg
Attorney United States Patent Office 3,015,792
Patented Jan. 2, 1962

3,015,792
POTENTIOMETER WIPER RECIPROCATING MECHANISM
George Towner Senseney, New York, and Dale Loren Hardy, New Rochelle, N.Y., assignors to USECO, Inc., Mount Vernon, N.Y.
Filed May 4, 1960, Ser. No. 26,842
9 Claims. (Cl. 338—145)

This invention relates to continuously rotatable multiturn potentiometers and more particularly to a mechanism for simultaneously positioning and reciprocating the potentiometer wiper.

As discussed in greater detail in the copending patent application of Joseph R. Altieri, entitled "Continuously Rotatable Multiturn Potentiometer," Serial No. 20,781, filed on April 7, 1960, and assigned to the assignee of the present invention, the term "multiturn helical potentiometer" denotes a particular class of potentiometer which is operative to exhibit an impedance that is variable in accordance with the position of an associated input shaft that rotates through a plurality of revolutions. In general, potentiometers of this type have relatively high resolution expressed as a percentage of the entire resistance range and may provide an impedance which varies linearly with shaft rotation, or, in accordance with some other predetermined function of position of the input shaft.

The resistive element of such potentiometers is generally in the form of a compound right cylindrical helix of fine resistance wire which is formed by winding the resistance wire over an insulating mandrel which is, in turn, coiled to provide a cylinder whose axis is either coincident with or parallel to the axis of the input shaft. The wiper element, in order to contact the resistive element, must therefore follow a helical path tangential to the resistive helix as the input shaft rotates. In the past, this has been achieved either by attaching the wiper assembly to a lead screw arrangement, or by the use of a guide shoe connected to the wiper which engages and tracks either the resistive helix or a guide helix that is interlaced between adjacent turns of the resistive helix.

The use of a guide shoe with a resistive helix is not the best expedient since its use may result in damage to the resistance elements by introducing dirt or other foreign matter into the helix or by possibly dislocating or deforming the individual turns of the resistance wire. A lead screw arrangement can propel the wiper assembly but, in turn, presents different problems. For example, limit stops, provided to prevent overtravel of the wiper assembly are frequently interposed in the path of wiper travel, and the wiper can be unduly worn or damaged by repeated collisions with the stop elements.

Furthermore, in both of these potentiometer types, it is necessary to reverse the direction of rotation of the input shaft once the resistive helix has been traversed in order to return the wiper assembly to the starting point. Moreover, if it is desired to make the device continuously rotatable, a coupling assembly, involving clutches and gear trains which are complex, expensive and seldom accurate to the requisite degree of precision, is required to connect the source of rotation to the input shaft so that a continuous input rotation in one direction can be used to return the wiper assembly after each traversal of the resistive element.

In the copending application, these difficulties of the prior art were avoided with a level wind type of mechanism being employed to drive the wiper assembly. A continuously rotatable, stopless, multiturn potentiometer was provided using a level wind mechanism in the form of a pair of counter wound helices for driving and guiding the wiper in the requisite spiral path. The present invention also uses the pair of counter wound helices in conjunction with a novel reciprocating mechanism which, in its broadest form, includes a first sprocketed follower engaging a guide helix that, when followed, moves the wiper assembly in a path counter to the path of the resistive helix. A cam shaft, connected to the follower, at the same time maintains the wiper element out of conductive engagement with the resistive helix. A counter wound second guide helix is provided which, when engaged by a second sprocketed follower, connected to the cam shaft, moves the wiper assembly in the path of the resistive helix. The followers track their respective helices alternatively, and the cam shaft is operable to maintain the wiper element in conductive engagement with the resistive helix when the second follower is moving the wiper assembly.

In the preferred embodiment of the invention, the reciprocating mechanism is mounted on a potentiometer having a resistive helix wrapped on a cylindrical core. Abutting the ends of the core is a pair of drums mounted coaxial therewith, each drum having a driving helix in the form of a track cut into the periphery thereof. One of the drums has a left hand helix and the other has a right hand helix, the pitch of the driving helices preferably corresponding to the pitch of the resistive helix.

More particularly, the reciprocating mechanism of the present invention includes a traveling carriage from which is suspended a wiper element and which carries a cam shaft and a pair of follower elements which are alternately engageable in the drive helices. Means are provided for simultaneously disengaging one of the followers and engaging the other follower when the carriage and wiper are at one end of the resistive helix, the arrangement being reversed at the other end of the helix. The cam shaft is arranged to enable electrical contact between the wiper element and the resistive helix during travel in the opposite axial direction. For the so-called "ten turn" potentiometer, continuous rotation of the input shaft thus produces a first output signal during an "operating" cycle of ten revolutions and a second output signal during a "non-operating" cycle of the next ten revolutions.

It should be noted, the present invention could also be used in conjunction with a potentiometer having only a single guide helix which is counter wound with respect to a resistive helix such as described and shown in the patent to J. W. Weidenman et al. for "Precision Potentiometer," Patent No. 2,871,326, issued January 27, 1959. To apply the principles of the present invention to such a device, the wiper assembly may be driven by the guide shoe in the conductive traverse. A counter wound guide helix is then provided which, in conjunction with an appropriate mechanism for disengaging the guide shoe, can drive the shoe in the return direction.

Accordingly, it is an object of the invention to provide a wiper carriage reciprocating mechanism that operates in conjunction with a pair of counter wound guide helices that are coaxial with a resistive helix.

It is another object of invention to provide a wiper carriage reciprocating mechanism that controls the conductive engagement of the wiper element with a resistive helix.

It is a further object of invention to provide a wiper carriage reciprocating mechanism that is alternately engageable with counter wound guide helices.

It is a still further object of invention to provide a wiper carriage reciprocating mechanism that alternately enables and disables conductive engagement between a wiper element and a conductive helix in accordance with the direction of reciprocation.

Another object of invention is to provide a mechanism to engage counter wound helices for reciprocating the wiper carriage of a continuously rotatable, multiturn potentiometer which also controls the conductive engagement of the wiper element with the resistive helix.

The novel features which are believed to be characteristic of the invention, both as to its organization and method of operation, together with further objects and advantages thereof, will be better understood from the following description considered in connection with the accompanying drawing in which one embodiment of the invention is illustrated by way of example. It is to be expressly understood, however, that the drawing is for the purpose of illustration and description only, and is not intended as a definition of the limits of the invention.

FIGURE 1 is a perspective view of a reciprocating mechanism according to the present invention, incorporated in a continuously rotatable potentiometer which is shown with the outer case removed;

FIGURE 2 is a side sectional view of the potentiometer of FIGURE 1 showing the details of construction;

FIGURE 3 is a sectional view of a portion of the potentiometer of FIGURE 2 taken along the line 3—3 in the direction of the appended arrows, showing in greater detail, the cam and follower mechanism in one stable position in which the wiper element is out of conductive engagement with the resistive element of the potentiometer;

FIGURE 4 is a view of the apparatus in FIGURE 3 in an alternative stable position, this time with the wiper element in conductive engagement with the resistive element.

With reference now to the drawings, there is shown in FIGURE 1 a continuously rotatable, multiturn potentiometer incorporating the wiper carriage reciprocating mechanism of the present invention. The potentiometer itself includes an input shaft 12 which is journaled within a hub assembly (as is shown in greater detail in FIGURE 2). An output conductor 14 is electrically connected to the wiper element of the potentiometer and provides an output signal which is a function of the potential impressed across a pair of input conductors 16 and 18 which are connected to opposite ends of the resistive helix 20, the resistive impedance of the potentiometer, and the rotational position of the input shaft 12.

Fixedly mounted to, and rotatable with the input shaft 12, is a wiper arm 22 which is electrically isolated from the input shaft 12 by a pair of insulating washers 24, 26, so that the arm may be included in the electrical path of the output signal from the resistive helix. A wiper element 28 is suspended from a wiper carriage 30 which is slidably mounted on the wiper arm 22 and which is movable in a direction parallel to the axis of the input shaft 12. The wiper element 28 is a moving electrical tap which contacts the resistive helix to signal the potential of the helix at the point of contact.

As is seen in the figures, the carriage reciprocating and wiper control mechanism includes a sprocket or follower mechanism portion which utilizes a mounting bracket 32 and a pair of sprocket or follower elements 34, 36 extending from the wiper carriage 30. The follower elements 34, 36 are connected to each other by a cam shaft 38 having a square cross section at the middle portion, and which is rotatably mounted in the bracket 32. The wiper element 28 is a portion of a strip of resilient metal that is wrapped about the carriage assembly 30 and extends outwardly from the lower surface, while a portion of the strip extending from the upper surface forms a detent spring 40 which is biased against the cam shaft 38 to maintain the shaft in one of two stable positions, relative to the square portion of the cam shaft. In one stable configuration, the detent spring 40 is positioned flat against one of the plane faces of the square portion of the cam shaft, substantially as shown in FIGURE 3, and in the other stable configuration one of the longitudinal edges of the cam is engaged by a matching V-shaped deformation or notch 42 in the detent spring 40, as shown in FIGURE 4.

For the square cam shaft shown, the followers 34 and 36 are of a cruciform shape and are positioned to be offset from each other by 45°. That is, each of the followers is a sprocket having four equally spaced teeth, or arms and, for example, follower 36, as viewed in FIGURE 1, is aligned with its four arms perpendicular to the faces of the cam shaft 38. The other follower 34 is rotated through 45° and its arms are aligned parallel to the diagonals of the square portion of the cam shaft 38. Thus in each of the stable positions of the cam shaft 38, at least one follower arm is aligned to coincide with a radial line extending from the axis of the input shaft 12.

Returning to FIGURES 1 and 2, the resistive element 20 is wrapped in a helix that, in this embodiment, is pitched to the right (as viewed in the figures) about a drum 44, coaxial with the input shaft 12, in a manner similar to that shown and described in the abovementioned Patent No. 2,871,326 for "Precision Potentiometers," granted to J. W. Weidenman et al., on January 27, 1959. Also coaxial with the input shaft 12 and adjacent the resistive helix 20, is a level wind mechanism in the form of a pair of guide drums 46, 48, which are mounted on opposite ends of the drum 44. A pair of respectively counter wound guide or driving helices are formed in the periphery of the guide drums 46, 48, and, in the embodiment of FIGURE 1, the degree of pitch of both guide helices is identical to that of the resistive helix 20, the guide helix 50 on the right hand drum being pitched to the right and the guide helix 52 on the left hand drum being pitched to the left. Thus the arms of the right follower 34 engage and track the right pitched helix 50 and the arms of the left follower 36 engage and track the left pitched helix 52. In operation, as described in more detail below, the followers are alternately engaged, the disengagement of one causing the engagement of the other.

To define the limits of travel of the carriage in each of the axial directions, four stop elements 54 are set in the grooves of the guide helices 50, 52, at locations which correspond to the wiper element 28 reaching the ends of the resistive helix 20. Each stop element 54 can be either a pin or, as shown in FIGURE 1, a deposit of epoxy which blocks the helix. When a follower tracking in the helix encounters the stop, the wiper arm continues to move, but a rotational motion is imparted to the follower about its own axis. The cam shaft 38 is thereby rotated and the opposite follower then engages its guide helix. The mechanism is operative without regard for the direction of motion of the input shaft 12, the stops 54 being located so that the wiper element 28 is placed into conductive engagement at one of the electrical ends of the resistive helix 20, and is removed at the other electrical end.

The carriage reciprocating and wiper control mechanisms of the present invention are seen in greater detail in FIGURES 3 and 4 which show alternate positions of the same assembly. In FIGURE 3, the wiper carriage assembly 30 is shown together with the wiper element 28, the detent spring portion 40, the cam shaft 38 and the follower elements 34, 36 and their spatial relation to each other and to the follower arm 22 and the resistive helix 20 can be clearly seen. A lining 56 is interposed between the carriage assembly 30 and the wiper arm 22 which lubricates and electrically isolates the sliding surfaces. In order to assure a good electrical contact between the wiper element 28 and the wiper arm 22, a hole is cut through the carriage assembly 30 and a wiper slide 58, which is fastened to the carriage, extends through the hole to slide upon the wiper arm 22 in good electrical contact. As can be seen from FIGURE 3, with the cam shaft 38 in one of its stable positions, the upper surface of the cam shaft 38 bears against the flat surface of the detent spring portion 40 and the lower cam shaft surface is substantially parallel to the wiper element 28. In the alternate stable configuration, best seen in FIGURE 4, the cam shaft is shown rotated through 45° and, as shown, a corner of the cam shaft is engaged in the V-shaped notch 42 of detent portion 40 which is provided for that function, and at the same time, the wiper element 28 is cammed into contact with the resistive helix 20 by the increase in cross sectional width of the cam shaft in that position.

In operation, continuous rotation of the input shaft 12 in one direction rotates the connected wiper arm 22 in that direction about that resistive helix 20 and the counter wound guide helices 50 and 52. With reference to FIGURE 1, assume first, that the input shaft is rotated in the direction marked by the arrow CW and let us assume that to be the clockwise direction. If the left hand follower 36 is initially in engagement with the left hand helix 52, then carriage 30 is in motion to the right (as viewed in FIGURE 1) and the wiper element 28 is biased out of engagement with the resistive helix 20. As this clockwise rotation continues, the wiper carriage 30 travels until the left hand stop member 54 of the left helix 52 is encountered by the left follower 36. The wiper arm continues to move past the stop, but the projecting arm of the follower 36 is blocked, rotating the cam shaft 38, until the arm is out of the guide helix. The detent spring portion 40, then continues the rotation of the cam shaft 38 until the edge of the cam shaft is engaged in the matching notch or groove 42 of the spring.

Simultaneously, with rotation of the cam shaft 38, an arm of the right hand follower 34 is rotated into engagement with the right hand helix 50 and the follower element 28 is cammed into contact with the resistive helix 20. As the input shaft continues to turn in the same, or clockwise direction, the wiper element 28 remains in continuous electrical contact with the resistive helix 20 and the wiper carriage 30 is transported laterally to the left as viewed in FIGURE 1 simultaneously with its rotational motion.

In prolonged unidirectional rotation of the input shaft 12, the wiper carriage 30 will reciprocate back and forth along the wiper arm 22 parallel to the axis of the input shaft. In successive multiturn cycles (in this embodiment, ten turns per cycle), the wiper carriage 30 is transported first by one of the driving helices and then by the other, alternately. Thus the wiper element is cammed into conductive engagement with the resistive helix when the carriage moves to the left and the wiper element is disengaged from the resistive helix when the carriage moves to the right. It will be readily seen that the potentiometer works equally well when continuously rotating in the reverse or counter clockwise direction as indicated by the arrow marked CCW. Here, the wiper engages the resistive helix at the left hand end and tracks in contact from left to right while the right hand follower is in engagement with the right hand guide helix.

It may readily be seen that the present invention is not limited to the square cam portion and the cruciform shape of the follower-sprocket. For example, a three-element follower-sprocket, used in conjunction with a bar of triangular cross section, would also be effective. In this arrangement, the arms of one follower correspond to the apices of the triangle and the arms of the other follower correspond to the faces of the triangle. Alternative embodiments may utilize cams having either more or fewer surfaces with corresponding numbers of arms on the followers.

Other potentiometer configurations lend themselves to the present invention. For example, the resistive helix may be used as one of the helices (as in prior art devices), or a guide helix may be interlaced with the resistive helix as shown in the above-mentioned Weidenman patent and in these devices, only a return, guide helix need be provided. Still other potentiometers are designed to have the wiper mechanism traversing the inner surface of the resistive helix but the modifications necessary to adapt the present invention to these devices will quickly occur to those skilled in the art.

Accordingly, the invention should be limited only by the scope of the claims appended below.

What is claimed as new is:

1. A reciprocating mechanism for a continuously rotatable multiturn potentiometer including a resistive helix having an axis, and a wiper element adapted to conductively engage the resistive helix, said reciprocating mechanism comprising: a guide helix mounted adjacent to and coaxial with the resistive helix and counter wound with respect thereto; wiper carriage means mounted adjacent the resistive helix and adapted to support the wiper element; means for imparting a relative rotational motion between said wiper carriage means and said guide and resistive helices; follower means connected to said carriage means and selectively engageable in said guide helix, said follower means being operative in response to relative rotational motion to transport said carriage means in the axial direction.

2. Reciprocating mechanism as in claim 1 above wherein said follower means is operable to transport said wiper element in a path relative to the resistive helix that is counter to the resistive helix.

3. A reciprocating mechanism for a continuously rotatable multiturn potentiometer including a resistive helix having an axis, and a wiper element adapted to conductively engage the resistive helix, said reciprocating mechanism comprising: a guide helix mounted adjacent to and coaxial with the resistive helix and counter wound with respect thereto; wiper carriage means mounted adjacent the resistive helix and adapted to support the wiper element; means for imparting a relative rotational motion between said wiper carriage means and said guide and resistive helices; follower means connected to said carriage means and selectively engageable in said guide helix, said follower means being operative in response to relative rotational motion to transport said carriage means in the axial direction, said follower means being operable to transport said wiper element in a path relative to the resistive helix that is counter to the resistive helix, said reciprocating mechanism further comprising: a second guide helix, counter wound with respect to said first mentioned guide helix, said second guide helix being mounted adjacent to and coaxial with said resistive helix; said follower means further including means selectively engageable in said second guide helix whereby said guide helices are alternatively engaged, said follower means being operative in response to relative rotational motion to transport said carriage means and wiper element in a path following the resistive helix when said second guide helix is engaged and to transport said carriage means and wiper element in a path counter to the resistive helix when said first mentioned guide helix is engaged.

4. In a continuously rotatable multiturn potentiometer including a resistive helix having an axis, a wiper element adapted to conductively contact the resistive helix, and means for imparting relative rotational motion as between the resistive helix and the wiper element, a mechanism for transporting the wiper element in the axial direction, said mechanism comprising: wiper carriage means connected to said wiper element and mounted adjacent the resistive helix; a guide helix counter wound with respect to the resistive helix and coaxial with the resistive helix; and cam and follower means connected to said wiper carriage and operable in a first stable position to simultaneously engage said guide helix and cam the wiper element out of contact with the resistive helix, and being operable in a second stable position to disengage said follower means from said guide helix and cam the wiper element into contact with the resistive helix; said cam and follower means in said first stable position being operable in response to relative rotational motion to transport said wiper carriage and wiper element in the axial direction, wherein the path of said wiper relative to the resistive helix is counter to the resistive helix.

5. The apparatus of claim 4, above, said mechanism further including a second guide helix counter wound with respect to said first recited guide helix and mounted adjacent the resistive helix, said cam and follower means further including means for engaging said second guide helix when in said second stable position, said cam and follower means in said second stable position being operable in response to relative rotational motion to transport said wiper carriage in the axial direction wherein the path of said wiper follows the resistive helix.

6. In a potentiometer including a resistive helix having an axis, a wiper element attached to a wiper assembly, and means adapted to receive rotational motion for rotating the wiper assembly about the periphery of the resistive helix, apparatus for cooperating with a pair of counter wound guide helices for reciprocatingly transporting the wiper assembly in the axial direction, said apparatus further comprising: a rotatable cam shaft adjacent the guide helices and coupled to the wiper assembly; a first follower mounted at one end of said cam shaft having a plurality of radial arms, each adapted to engage one of the guide helices, said arms being spaced to permit an intermediate positioning with none of said first follower arms in engagement with the helix; a second follower mounted at the other end of said cam shaft, having a corresponding plurality of radial arms, each adapted to engage the other of the guide helices, said arms being spaced to permit an intermediate positioning with none of said second follower arms in engagement with the helix, said first and second followers being respectively oriented on said cam shaft to be alternatively engaged in a guide helix; said cam shaft having a plurality of first stable positions each correlated to the engagement of one of said follower arms with said one guide helix and a corresponding plurality of second stable positions, each correlated to the engagement of one of said second follower arms with the other guide helix; and switching means at the ends of said guide helices for engaging said follower means to alternate the stable positions of said cam shaft, said apparatus operating in response to rotation of the wiper assembly for transporting the wiper assembly in the axial direction corresponding to the direction of the pitch of the guide helix engaged by its respective follower.

7. Apparatus in claim 6 above wherein said cam shaft is operable in one of said stable positions for conductively engaging the wiper element with the resistive helix, and operable in the other of said stable positions for disengaging the wiper element from the resistive helix, whereby said wiper element is in conductive engagement while traversing a helical path following the resistive helix, and said wiper element is out of conductive engagement while traversing a helical path counter to the resistive helix.

8. In a continuously rotatable multiturn potentiometer including a resistive helix having an axis, and a pair of respectively counter wound guide helices aligned axially with the resistive helix, the combination comprising: a wiper element for conductively engaging the resistive helix; a wiper carriage for carrying said wiper element adjacent the resistive helix; support means adapted to receive applied rotational motion for slidingly supporting said wiper carriage in rotational motion concentric with the axis of the resistive helix; follower means coupled to said carriage means and having a first and second stable position, said follower means in said first stable position engaging one of said guide helices and being operable to cam said wiper element out of conductive engagement with the resistive helix, and being further operable in response to applied rotation for transporting said wiper element in a helical path having a path counter to that of the resistive helix, said follower means in said second stable position engaging the other of said guide helices and being operable to cam said wiper element into conductive engagement with the resistive helix, and being further operable in response to applied rotation for sliding said carriage to move said wiper element in the helical path of the resistive helix; and switching means mounted on said guide helices for alternating the stable positions of said follower.

9. In a potentiometer for exhibiting an impedance that is variable in accordance with the position of a rotatable input shaft, the combination comprising: a resistive helix having an axis; a pair of respectively counter wound guide helices mounted adjacent to and coaxial with said resistive helix; an arm coupled to the input shaft and positioned parallel to and rotatable about the periphery of said resistive helix; a wiper carriage slidingly mounted on said arm; a wiper element carried by said carriage and adapted to conductively engage said resistive helix; and tracking means connected to said wiper carriage for imparting sliding motion to said carriage, said tracking means including a rotatably mounted cam shaft positioned for alternatively bringing said wiper element into and out of conductive engagement with said resistive helix, said tracking means further including a pair of follower sprockets mounted on said cam shaft, each of said follower sprockets being positioned to engage a respective one of said pair of guide helices, said sprockets being phased to be alternately engageable with their respective guide helices, said tracking means being operable in response to applied rotation of the input shaft for alternatively engaging one sprocket in one guide helix to position said cam shaft for bringing said wiper element into conductive engagement with said resistive helix, and for engaging the other sprocket in the other guide helix to position said cam shaft for bringing said wiper element out of conductive engagement with said resistive helix.

References Cited in the file of this patent
UNITED STATES PATENTS 1,853,798 Brownell _____ Apr. 12, 1932

FOREIGN PATENTS 679,393 Germany _____ Mar. 23, 1937